United States Patent [19]

Boudot et al.

[11] Patent Number: 4,742,028
[45] Date of Patent: May 3, 1988

[54] OPTICAL AND OPHTHALMIC GLASSES

[75] Inventors: Jean E. Boudot; Jean P. Mazeau; Michel Prassas, all of Avon, France

[73] Assignee: Corning Glass Works, Corning, N.Y.

[21] Appl. No.: 876,933

[22] Filed: Jun. 20, 1986

[30] Foreign Application Priority Data

Nov. 29, 1985 [FR] France ................... 85 17658

[51] Int. Cl.$^4$ ............. C03C 4/00; C03C 3/068; C03C 3/066
[52] U.S. Cl. ........................ 501/78; 501/79; 501/901; 501/903
[58] Field of Search ............ 501/78, 79, 901, 903

[56] References Cited

U.S. PATENT DOCUMENTS

| | | | |
|---|---|---|---|
| 3,503,764 | 3/1970 | Young | 501/78 |
| 3,877,953 | 4/1975 | Broemer et al. | 501/903 |
| 3,999,997 | 12/1975 | Faulstich et al. | 501/78 |
| 4,055,435 | 10/1977 | Sagara | 501/78 |
| 4,057,435 | 11/1977 | Boudot et al. | 501/903 |
| 4,084,978 | 4/1978 | Sagara | 501/78 |
| 4,213,786 | 7/1980 | Faulstich et al. | 501/901 |
| 4,390,638 | 6/1983 | Mennemann et al. | 501/78 |
| 4,400,473 | 8/1983 | Mennemann et al. | 501/78 |
| 4,404,290 | 9/1983 | Boudot | 501/903 |
| 4,481,299 | 11/1984 | Tajima | 501/73 |

Primary Examiner—Mark L. Bell
Attorney, Agent, or Firm—Clinton S. Janes, Jr.

[57] ABSTRACT

This invention is concerned with a glass for optical and/or ophthalmic applications having an index of refraction between about 1.78–1.82, an Abbe number greater or equal to 31, and a density less than about 3.80 g/cm$^3$ consisting essentially, expressed in terms of weight percent on the oxide basis, of:

| | | | |
|---|---|---|---|
| $SiO_2$ | 15–30 | CaO | 15–28 |
| $B_2O_3$ | 2–17 | SrO | 0–11 |
| $SiO_2 + B_2O_3$ | 24–36 | BaO | 0–11 |
| $Al_2O_3$ | 0–6.5 | MgO + CaO + SrO + BaO | 16–33 |
| $Li_2O$ | 0–5 | ZnO | 0–11 |
| $Na_2O$ | 0–5 | $La_2O_3$ | 16–30 |
| $K_2O$ | 0–5 | $ZrO_2$ | 0–10 |
| $Li_2O + Na_2O + K_2O$ | 0–6 | $Nb_2O_5$ | 5–26 |
| MgO | 0–6 | $TiO_2$ | 0–14. |

1 Claim, No Drawings

OPTICAL AND OPHTHALMIC GLASSES

BACKGROUND OF THE INVENTION

The present invention is concerned with glasses for the fabrication of lenses for optical and/or ophthalmic applications, the glasses having an index of refraction ($n_d$) between about 1.78–1.82, an Abbe number ($\nu_d$) greater or equal to 31, and density ($\rho$) less than about 3.80 g/cm$^3$.

For eyeglasses of high correction, the use of a glass having an index of refraction of 1.8 permits, when compared to glasses having lower indices of refraction (1.6–1.7) and of equal correction power, a significant reduction in thickness at the edge (in lenses of negative power) and at the center (in lenses of positive power).

This constitutes an undeniable advantage for the wearer of eyeglasses, particularly in those cases of high corrections (>6 diopters). In other respects, it is known that an increase in the index of refraction is generally accompanied by a degradation of other characteristic properties of a glass; in particular, the density commonly increases. In order that a glass of high index can retain the advantages in comfort mentioned above, it will be necessary that its density not be too high.

Another drawback often associated with an increase in the index is an increase in the dispersion (or a decrease in the Abbe number).

SUMMARY OF THE INVENTION

The object of the invention is to produce glasses of low dispersion complying with the criteria stated above. In other respects, the glasses exhibit excellent chemical durability (a weight loss following the American Optical test of <0.2 mg/cm$^2$) and a transmission at 400 nm in a thickness of 2 mm greater than about 76%.

The inventive glasses exhibit a liquidus temperature which is less than 1300° C. and, preferably, less than 1180° C. The viscosity at this temperature is several tens of poises.

More particularly, the invention is concerned with a glass having the following chemical composition, expressed in terms of weight percent on the oxide basis, of:

| | | | |
|---|---|---|---|
| $SiO_2$ | 15–30 | CaO | 15–28 |
| $B_2O_3$ | 2–17 | SrO | 0–11 |
| $SiO_2 + B_2O_3$ | 24–36 | BaO | 0–11 |
| $Al_2O_3$ | 0–6.5 | MgO + CaO + SrO + BaO | 16–33 |
| $Li_2O$ | 0–5 | ZnO | 0–11 |
| $Na_2O$ | 0–5 | $La_2O_3$ | 16–30 |
| $K_2O$ | 0–5 | $ZrO_2$ | 0–10 |
| $Li_2O + Na_2O + K_2O$ | 0–6 | $Nb_2O_5$ | 5–26 |
| MgO | 0–6 | $TiO_2$ | 0–14. |

Observance of the above-mentioned ranges of constituents for the glasses is very important in order to obtain the physical and chemical properties required for the envisaged application.

In particular, when $B_2O_3$ replaces $SiO_2$, the viscosity at the liquidus is reduced and the chemical durability is degraded. The maximum content of $B_2O_3$ should not exceed 17%. A minimum content of $B_2O_3$ appears to be necessary, however, in order to reduce the tendency of these glasses to opalize. This content is about 2% by weight.

Furthermore, the sum of the glass forming oxides $SiO_2$ and $B_2O_3$ should not be greater than 36% by weight. Beyond this limit, the index of refraction decreases and the tendency of the glass to devitrify is considerably increased.

$Al_2O_3$ increases the viscosity and improves the durability of the glass. On the other hand, it increases the tendency toward devitrification if it is present in amounts greater than 6.5% by weight.

The alkali metal oxides $Li_2O$, $Na_2O$, and $K_2O$, although making only a small contribution to the density of the glass, will only be used in small proportions. In fact, added in large amounts, they decrease the viscosity of the glass (especially $Li_2O$), increase the tendency for phase separation and/or devitrification, and degrade the chemical durability.

Among the bivalent oxides, MgO exhibits the same advantages and drawbacks as the alkali metal oxides. Moreover, its contribution to the index, although greater than that of $Li_2O$, $Na_2O$ and $Kd_2O$, is nevertheless, small when compared with the other bivalent oxides. Therefore, the maximum amount of MgO should not exceed 6% by weight.

ZnO, SrO, BaO and CaO are among the bivalent oxides exercising a medium contribution to the index. However, when the first three are added to the glass in amounts greater than 11% by weight, the density and also the dispersion are considerably increased.

CaO allows this drawback to be palliated. Therefore, its content should comprise between 15–28% by weight. When a combination of the oxides MgO, CaO, SrO and BaO is utilized, their sum should satisfy the following condition:

$$16\% \leq MgO + CaO + SrO + BaO \leq 33\%$$

Among the other oxides exercising a strong contribution to the index of refraction, such as $TiO_2$, $Nb_2O_5$, $ZrO_2$, and $La_2O_3$, $La_2O_3$ is the one which exhibits the best compromise between index and dispersion. Therefore, it should be present in the glass in an amount of at least 16% by weight. In fact, below this limit, the contribution to the refractive index will be effected either with a considerable decrease in the transmission and in the Abbe number ($TiO_2$), or with an increase in the tendency toward devitrification (CaO, $ZrO_2$), or with an excessive increase in the price of the composition ($Nb_2O_5$). Its content will be limited, nevertheless, the 30% by weight because, beyond that amount, the addition of $La_2O_2$ becomes harmful for the density and for the devitrification tendency of the glass.

$TiO_2$ is the constituent which offers the best compromise between density and refractive index. However, used in a great amount it decreases the visible transmission of the glass, increases the devitrification tendency of the glass, and rapidly reduces the Abbe number. Therefore, its content will not exceed 14% by weight.

$ZrO_2$ increases the index of refraction and the density of the glass, but reduces the Abbe number less rapidly than $TiO_2$. Furthermore, this oxide improves the alkali durability of the glass. Its amount will be limited to 10% by weight. Beyond that, crystallization becomes significant.

In order to avoid the limitations due to the use to $TiO_2$ and $ZrO_2$, the glass should contain at least 5% by weight $Nb_2O_5$. That oxide increases the index of refraction more rapidly than $ZrO_2$ and reduces the Abbe number nearly two times more slowly than $TiO_2$. Its maximum amount will not exceed 26% by weight because, beyond that amount, devitrification of the glass becomes significant and, above all, the price of the glass becomes prohibitive.

Other oxides such as $Y_2O_3$, $Gd_2O_3$, $Ta_2O_5$ and $WO_3$ can be added in quantities less than or equal to 5% by weight. By reason of their excessive cost, however, the glass will preferably not contain any of them.

In order to obtain glasses having an index of refraction between 1.79–1.81, a density less than or equal to 3.75 g/cm³, and Abbe number greater than 33, and a transmission at 400 nm at a thickness of 2 mm greater than or equal to 78%, the constituents of the glass will preferably consist essentially in the ranges specified below:

| | | | |
|---|---|---|---|
| $SiO_2$ | 21–30 | BaO | 0–5 |
| $B_2O_3$ | 2–10 | MgO + CaO + SrO + BaO | 18–30 |
| $SiO_2 + B_2O_3$ | 24–33 | ZnO | 0–5 |
| $Al_2O_3$ | 0–3 | $La_2O_3$ | 18–22 |
| $Li_2O + Na_2O + K_2O$ | 0–5 | $ZrO_2$ | 1–5 |
| MgO | 0–3 | $Nb_2O_5$ | 6–15 |
| CaO | 15–23 | $TiO_2$ | 5–13 |
| SrO | 0–5 | | |

PRIOR ART

U.S. Pat. No. 3,503,764 discloses glases having refractive indices ranging about 1.83–1.90 consisting essentially, in weight percent, of:

| | | | |
|---|---|---|---|
| $SiO_2$ and/or $B_2O_3$ | 15–30 | $Li_2O$ and/or $Na_2O$ and/or $K_2O$ | 0–5 |
| $Nb_2O_5$ | 5–20 | CaO and/or SrO | 0–10 |
| $Ta_2O_5$ | 0–10 | CdO and/or ZnO | 0–15 |
| BaO | 15–45 | $La_2O_3$ | 15–30 |
| $TiO_2$ | 5–20 | | |

The BaO content is too high and the CaO content too low.

U.S. Pat. No. 3,877,953 describes glasses exhibiting refractive indices between 1.5410–1.7942, Abbe numbers between 25.5–49.9 and good chemical resistance consisting essentially of:

| | | | |
|---|---|---|---|
| $SiO_2$ | 22–30 | $Nb_2O_5$ | 2–53 |
| $B_2O_3$ | 8–14 | $K_2O$ | 9–22 |
| $SiO_2 + B_2O_3$ | 30–42 | | | plus a host of optional ingredients in varying amounts. The level of $K_2O$ is too high and, even if that factor be ignored, none of the working examples has a composition falling within the limits of the present invention.

U.S. Pat. No. 3,999,997 discusses glasses demonstrating refractive indices between 1.58–1.67 and Abbe numbers between 30–44 consisting essentially of:

| | | | |
|---|---|---|---|
| $SiO_2$ | 6–25 | $Nb_2O_5$ | 4–20 |
| $B_2O_3$ | 15–36 | F | 5–12 |
| $K_2O$ | 13–21 | $Al_2O_3$ | 0–5 |
| BaO | 6–30 | CaO | 0–8 |

| | | | |
|---|---|---|---|
| $ZrO_2$ | 4–17 | SrO | 0–15 |
| $TiO_2$ | 6–10 | $La_2O_3$ | 0–5 |

The $K_2O$ content is too high, the CaO and $La_2O_3$ contents are too low, and fluoride is a required ingredient.

U.S. Pat. No. 4,057,435 is concerned with glasses having refractive indices ≧1.7, Abbe numbers ≧40, and densities of about 3 g/cm³ consisting essentially of:

| | | | |
|---|---|---|---|
| $SiO_2$ | 0–15 | $Na_2O + Li_2O$ | 0–4 |
| $B_2O_3$ | 20–54 | $Al_2O_3$ | 0–5 |
| $SiO_2 + B_2O_3$ | 42–54 | $La_2O_3$ | 9–15 |
| $TiO_2$ | 9–15 | $Gd_2O_3$ | 0–5 |
| CaO | 18–28 | $Y_2O_3$ | 0–5 |
| BaO | 0–15 | $Nb_2O_5$ | 0–5 |
| CaO + BaO | 20–34 | $ZrO_2$ | 0–4 |
| MgO | 0–5 | $WO_3$ | 0–4 |
| $Na_2O$ | 0–4 | ZnO | 0–4 |
| $Li_2O$ | 0–4 | | |

The concentration of $B_2O_3$ is too high and those of $La_2O_3$ and $Nb_2O_5$ too low.

U.S. Pat. No. 4,084,978 presents glasses manifesting refractive indices ≧1.69, Abbe number ≧40, and densities ≦3.2 consisting essentially of:

| | | | |
|---|---|---|---|
| $SiO_2$ | 20–50 | $Na_2O + K_2O$ | 0–15 |
| $Al_2O_3$ | 0–13 | $Li_2O + Na_2O + K_2O$ | 1–20 |
| $B_2O_3$ | 0–20 | $ZrO_2$ | 0–11 |
| $SiO_2 + Al_2O_3 + B_2O_3$ | 36–50 | $TiO_2$ | 0–3 |
| CaO | 5–35 | $Nb_2O_5$ | 8–30 |
| MgO | 0–20 | $ZrO_2 + TiO_2 + Nb_2O_5$ | 16–34 |
| CaO + MgO | 5–35 | BaO + SrO + ZnO | 0–15 |
| $Li_2O$ | 0–15 | $La_2O_3 + Ta_2O_5 + WO_3$ | 0–15 |

$La_2O_3$ is merely an optional component in quantities too low for the present invention. Even ignoring that factor, none of the working examples has a composition coming within the limits of the present invention.

U.S. Pat. No. 4,213,786 reports glasses of refractive indices between 1.77–1.81 and densities between 3.4–3.8 consisting essentially of:

| | | | |
|---|---|---|---|
| $SiO_2$ | 15–20 | ZnO | 0–4 |
| $B_2O_3$ | 10–20 | $Al_2O_3$ | 0–2 |
| $SiO_2 + B_2O_3$ | 30–40 | $ZrO_2$ | 0–3 |
| $La_2O_3$ | 16–26 | $Nb_2O_5$ | 0–5 |
| $TiO_2$ | 15–25 | $Ta_2O_5$ | 0–2 |
| MgO | 0–3 | $P_2O_5$ | 0–3 |
| SrO | 1–10 | $GeO_2$ | 0–3 |
| BaO | 0–8 | $Li_2O$ | 0–5 |
| MgO + SrO + BaO | 8–15 | $Na_2O$ | 0–5 |
| CaO | 8–15 | $K_2O$ | 0–5 |
| MgO + CaO + SrO + BaO | 20–25 | $Li_2O + Na_2O + K_2O$ | 0–5 |

The concentrations of CaO and $Nb_2O_5$ are too low.

U.S. Pat. No. 4,390,638 records glasses displaying refractive indices ≧1.69, Abbe numbers ≧37, and densities ≦3.30 consisting essentially of:

| | | | |
|---|---|---|---|
| $SiO_2$ | 18–36 | CaO | 7–25 |
| $B_2O_3$ | 3–18 | MgO + CaO | 15–32 |
| $GeO_2$ | 0–8 | SrO | 0–13 |
| $Al_2O_3$ | 0–6 | BaO | 0–17 |
| $SiO_2 + B_2O_3 + Al_2O_3 + GeO_2$ | 25–39 | ZnO | 0–15 |
| $P_2O_5$ | 0–14 | PbO | 0–10 |

-continued

| | | | |
|---|---|---|---|
| $SiO_2 + B_2O_3 + Al_2O_3 + GeO_2 + P_2O_5$ | 30–44 | $SrO + BaO + ZnO + PbO$ | 0–20 |
| $Li_2O$ | 0–12 | $TiO_2$ | 3–14 |
| $Na_2O$ | 0–14 | $Nb_2O_5$ | 0–13 |
| $K_2O$ | 0–18 | $WO_3$ | 0–10 |
| $Li_2O + Na_2O + K_2O$ | 2–18 | $TiO_2 + Nb_2O_5 + WO_3$ | 10–21 |
| $MgO$ | 0–15 | $ZrO_2$ | 0–15 |
| $La_2O_3$ | 0–20 | $La_2O_3 + Y_2O_3 + Gd_2O_3$ | 0–20 |
| $Y_2O_3$ | 0–16 | $Ta_2O_5$ | 0–13 |
| $Gd_2O_3$ | 0–16 | $HfO_2$ | 0–6 |
| $Yb_2O_3$ | 0–10 | $SnO_2$ | 0–6 |

Whereas the above composition intervals can be read to overlap the ranges of the present invention, no working example in the patent exhibits a refractive index coming close to 1.78–1.82 and no working example has a composition within the ranges of the present invention.

U.S. Pat. No. 4,400,473 recites glasses demonstrating refractive indices $\geq 1.69$, Abbe numbers $\geq 38$, and densities $\leq 3.25$ g/cm$^3$ consisting essentially of:

| | | | |
|---|---|---|---|
| $SiO_2$ | 26–32.5 | $SrO$ | 0–6 |
| $B_2O_3$ | 0–3 | $BaO$ | 0–5 |
| $Al_2O_3$ | 0–3 | $ZnO$ | 0–7 |
| $P_2O_5$ | 0.5–4 | $PbO$ | 0–4 |
| $Li_2O$ | 0–5 | $La_2O_3$ | 6–11 |
| $Na_2O$ | 0–6 | $ZrO_2$ | 5–8 |
| $K_2O$ | 0–8 | $TiO_2$ | 5–9 |
| $MgO$ | 0–8 | $Nb_2O_5$ | 6–11 |
| $CaO$ | 9–16 | $WO_3$ | 0–4 |
| $MgO + CaO$ | | | 13–17.5 |
| $La_2O_3 + ZrO_2$ | | | 13.5–17.5 |
| $Li_2O + Na_2O + K_2O$ | | | 4.5–12 |
| $TiO_2 + Nb_2O_5 + WO_3$ | | | 14–18 |
| $SiO_2 + B_2O_3 + Al_2O_3 + P_2O_5$ | | | 38.5–41.5 |
| $SrO + BaO + ZnO + PbO$ | | | 17–24 |
| $ZrO_2 + TiO_2 + Nb_2O_5$ | | | 20–26 |
| $La_2O_3 + ZrO_2 + TiO_2 + Nb_2O_5 + WO_3$ | | | 28–33 |
| $MgO + CaO + SrO + BaO + ZnO + PbO$ | | | 28–33 |

The levels of $La_2O_3$ are too low and, even ignoring that factor, none of the working examples of the patent falls within the composition ranges of the present inventive glasses.

U.S. Pat. No. 4,404,290 discloses glasses displaying refractive indices between about 1.695–1.705, Abbe numbers between about 40.5–43.2, and densities below about 3.2 g/cm$^3$ consisting essentially of:

| | | | |
|---|---|---|---|
| $SiO_2$ | 16–20 | $La_2O_3$ | 6–15 |
| $B_2O_3$ | 20.5–25 | $Nb_2O_5$ | 3–11 |
| $Al_2O_3$ | 5.5–12 | $TiO_2$ | 3.5–<9 |
| $CaO$ | 16–21.5 | $ZrO_2$ | 2–10 |

The quantities of $B_2O_3$ are too high and those of $La_2O_3$ too low.

DESCRIPTION OF PREFERRED EMBODIMENTS

The invention is further illustrated through the non-limiting examples reported in the table below. The preferred example is No. 23. All proportions of the glass constituents are given in terms of weight percent on the oxide basis.

EXAMPLES OF GLASS PREPARATION

The various constituents of the glass are provided by the batch materials specified below:

| Oxides | Batch Materials |
|---|---|
| $SiO_2$ | Quartz |
| $B_2O_3$ | $B(OH)_3$ |
| $Al_2O_3$ | $Al(OH)_3$ |
| $Li_2O$ | $Li_2CO_3$ |
| $Na_2O$ | $Na_2CO_3$, $NaNO_3$ |
| $K_2O$ | $K_2CO_3$, $KNO_3$ |
| $MgO$ | $MgCO_3$ |
| $CaO$ | $CaCO_3$, $Ca(NO_3)_2$ |
| $BaO$ | $BaCO_3$, $Ba(NO_3)_2$ |
| $ZnO$ | $ZnO$ |
| $La_2O_3$ | $La_2O_3$ |
| $Nb_2O_5$ | $Nb_2O_5$ |
| $ZrO_2$ | $ZrO_2$ |
| $TiO_2$ | $TiO_2$ |

The batch materials selected will preferably contain a minimal amount of transition metals, in particular $Fe_2O_3$, in order to insure that the glass obtained exhibits a transmission at 400 nm within the limits defined in the preceding paragraphs.

After weighing, the various batch materials were mixed together in accordance with conventional techniques. The batch was then charged into a platinum crucible and the crucible introduced into a furnace operating at about 1300° C. When the batch was completely melted, the temperature of the furnace was raised to about 1350°–1400° C. to achieve homogenization and fining of the melt. The melt was then cooled to a temperature corresponding to a viscosity adequate for forming and cast in the form of a bar.

The total time of the operation was on the order of 2–7 hours. After forming, the glass was annealed at about 700°–750° C. with a rate of cooling of 60° C./hour, and the properties thereof were determined as described in the following paragraph.

MEASUREMENTS OF THE PHYSICAL AND CHEMICAL PROPERTIES OF THE GLASSES

The measurements of refractive index ($n_d$) and the Abben number ($v_2$) were carried out according to conventional method (for $n_d$, the yellow line of He was used) on the annealed samples. The density ($\rho$) was measured through the immersion method and expressed in g/cm$^3$.

Chemical resistance was evaluated through the A.O. test (A.O.) described in the magazine "Applied Optics", 7, No. 5, page 847, May 1968. It consists in determining the loss of weight of a polished sample after immersion for 10 minutes in a bath of an aqueous 10% HCL solution operating at 25° C. Weight loss is expressed in terms of mg/cm$^2$.

The liquidus temperature (Liq.) was determined with the aid of a thermal gradient furnace. The samples were fired for 17 hours; the presence of crystals being revealed through observation of the cooled sample with an optical microscope.

A rotating viscosimeter was used in determining the high temperature viscosity of the samples.

The transmission (Trans.) of the glass at 400 nm was determined on polished samples of 2 mm thickness with the aid of a Hewlett Packard Type 8450A spectrophotometer.

We claim:

1. A glass for optical and/or ophthalmic applications having an index of refraction between 1.79–1.81, a density less than or equal to 3.75 g/cm$^3$, an Abbe number greater than 33, and a transmission at a thickness of 2 mm greater than or equal to 78% characterized in that

TABLE

|  | 1 | 2 | 3 | 4 | 5 | 6 | 7 | 8 |
|---|---|---|---|---|---|---|---|---|
| $SiO_2$ | 15 | 29.04 | 18 | 18 | 17.74 | 22 | 27 | 25 |
| $B_2O_3$ | 17 | 2 | 10 | 10 | 10 | 6 | 4 | 5 |
| $Al_2O_3$ | — | — | 6.5 | — | — | 2 | 1 | — |
| $Li_2O$ | — | — | 1 | — | 1 | — | — | — |
| $Na_2O$ | — | — | — | — | — | — | — | — |
| $K_2O$ | — | — | — | — | — | — | — | — |
| MgO | 1 | 3 | — | 6 | 3 | — | — | — |
| CaO | 20 | 20 | 20 | 17 | 15 | 28 | 19 | 20 |
| SrO | — | — | — | — | — | — | — | — |
| BaO | — | — | — | — | 7.32 | — | — | — |
| ZnO | — | — | — | — | — | — | — | — |
| $La_2O_3$ | 19 | 18.09 | 20 | 19 | 20 | 19 | 29 | 21.4 |
| $ZrO_2$ | 6 | 3 | 3 | 8 | 3 | 3 | 2 | — |
| $Nb_2O_5$ | 12 | 13.66 | 10.5 | 22 | 10.85 | 11 | 9 | 26 |
| $TiO_2$ | 10 | 11.21 | 11 | — | 10.09 | 10 | 10 | 2.6 |
| $n_d$ | 1.8038 | 1.8054 | 1.7885 | 1.7940 | 1.8001 | 1.7989 | 1.8051 | 1.8038 |
| $v_d$ | 34.8 | 33.7 | 35.1 | 37.9 | 35.14 | 35.6 | 36.2 | 35.4 |
| $\rho$ | 3.62 | 3.65 | 3.56 | 3.77 | 3.74 | 3.63 | 3.77 | 3.77 |
| A.O. | 0.08 | 0 | 0.05 | 0.02 | 0.10 | 0.13 | 0.01 | 0.008 |
| Trans | 76.8 | 76 | 78.6 | 79.9 | 79.5 | 79.2 | 79.2 | 81.1 |
| Liq. | ~1115 | ~1180 | ~1130 | — | ~1085 | ~1230 | ~1230 | ~1230 |

|  | 9 | 10 | 11 | 12 | 13 | 14 | 15 | 16 |
|---|---|---|---|---|---|---|---|---|
| $SiO_2$ | 21 | 18 | 27.13 | 27 | 27 | 22 | 20 | 21 |
| $B_2O_3$ | 8 | 14 | 4.02 | 4 | 4 | 9 | 9 | 9 |
| $Al_2O_3$ | 2 | — | — | — | — | — | 2 | — |
| $Li_2O$ | — | — | 4.02 | — | — | — | — | — |
| $Na_2O$ | — | — | — | — | 2 | — | — | — |
| $K_2O$ | — | — | — | 2 | — | — | — | — |
| MgO | — | — | — | — | — | — | — | — |
| CaO | 19 | 20 | 20.1 | 20 | 20 | 19 | 17 | 18 |
| SrO | — | — | — | — | — | 10 | — | — |
| BaO | 4 | 2 | — | 3 | 3 | — | 10 | — |
| ZnO | — | — | — | — | — | — | — | 11 |
| $La_2O_3$ | 24 | 20 | 20.1 | 20 | 20 | 18 | 18 | 18 |
| $ZrO_2$ | 5 | 3 | 3.02 | 3 | 3 | 1 | 3 | 3 |
| $Nb_2O_5$ | 6 | 10 | 10.55 | 11 | 11 | 11 | 11 | 10 |
| $TiO_2$ | 11 | 13 | 11.06 | 10 | 10 | 10 | 10 | 10 |
| $n_d$ | 1.7969 | 1.8080 | 1.7884 | 1.7900 | 1.7895 | 1.7876 | 1.7953 | 1.8038 |
| $v_d$ | 36 | 33.8 | 35.5 | 35.2 | 35.7 | 35.9 | 35.1 | 34.7 |
| $\rho$ | 3.75 | 3.64 | 3.56 | 3.65 | 3.64 | 3.69 | 3.76 | 3.76 |
| A.O. | 0.1 | 0.08 | 0.03 | 0.02 | 0.02 | 0.10 | 0.05 | 0.07 |
| Trans | 79.8 | 77.1 | 79.8 | 80.7 | 80.6 | 80.6 | 78.4 | 77.6 |
| Liq. | ~1125 | ~1075 | ~1120 | ~1125 | ~1175 | ~1075 | ~1075 | ~1075 |

|  | 17 | 18 | 19 | 20 | 21 | 22 | 23 |
|---|---|---|---|---|---|---|---|
| $SiO_2$ | 22 | 22 | 22 | 22 | 18.04 | 26 | 26 |
| $B_2O_3$ | 7 | 7 | 9 | 9 | 5 | 5 | 5 |
| $Al_2O_3$ | — | — | — | — | 2 | — | — |
| $Li_2O$ | — | — | — | — | 1 | — | — |
| $Na_2O$ | — | — | — | — | — | — | — |
| $K_2O$ | — | — | — | — | — | — | — |
| MgO | 2 | 2 | — | — | 3 | 1.5 | — |
| CaO | 20 | 20 | 20 | 20 | 20 | 22.1 | 22.7 |
| SrO | — | — | — | — | — | — | — |
| BaO | — | — | — | — | 1.39 | — | — |
| ZnO | — | — | — | — | — | — | — |
| $La_2O_3$ | 20 | 20 | 19 | 19 | 20 | 18.1 | 19.6 |
| $ZrO_2$ | 3 | 3 | 1 | 1 | 3 | 3 | 3 |
| $Nb_2O_5$ | 11 | 11 | 17 | 17 | 10.86 | 13.7 | 13.7 |
| $TiO_2$ | 10 | 10 | 7 | 7 | 10.71 | 10.6 | 10 |
| $Gd_2O_3$ | 5 | — | — | — | — | — | — |
| $Y_2O_3$ | — | 5 | — | — | — | — | — |
| $Ta_2O_5$ | — | — | 5 | — | — | — | — |
| $WO_3$ | — | — | — | 5 | — | — | — |
| $P_2O_5$ | — | — | — | — | 5 | — | — |
| $n_d$ | 1.8063 | 1.8082 | 1.8023 | 1.8000 | 1.7985 | 1.8039 | 1.8038 |
| $v_d$ | 35.2 | 35.3 | 34.7 | 34.6 | 35.1 | 34.3 | 34.7 |
| $\rho$ | 3.77 | 3.74 | 3.74 | 3.72 | 3.67 | 3.63 | 3.66 |
| A.O. | 0.04 | 0.04 | 0.006 | 0.005 | 0.05 | 0.01 | 0.007 |
| Trans | 78.4 | 79.3 | 80.2 | 79.8 | 77.3 | 79.7 | 80.7 |
| Liq. | ~1155 | ~1200 | ~1160 | ~1125 | ~1175 | ~1170 | ~1165 | it consists essentially, expressed in terms of weight percent on the oxide basis, of:

| | | | |
|---|---|---|---|
| $SiO_2$ | 21–30 | BaO | 0–5 |
| $B_2O_3$ | 2–10 | MgO + CaO + SrO + BaO | 18–30 |

| | | | |
|---|---|---|---|
| $SiO_2 + B_2O_3$ | 24–33 | ZnO | 0–5 |
| $Al_2O_3$ | 0–3 | $La_2O_3$ | 18–22 |
| $Li_2O + Na_2O + K_2O$ | 0–5 | $ZrO_2$ | 1–5 |
| MgO | 0–3 | $Nb_2O_5$ | 6–15 |
| CaO | 15–23 | $TiO_2$ | 5–13. |
| SrO | 0–5 | | |

* * * * *

UNITED STATES PATENT AND TRADEMARK OFFICE
CERTIFICATE OF CORRECTION

PATENT NO. : 4,742,028
DATED : May 3, 1988
INVENTOR(S) : Jean E. Boudot et al.

It is certified that error appears in the above-identified patent and that said Letters Patent is hereby corrected as shown below:

Column 2, line 18, "$Kd_2O$" should read --$K_2O$--.

Column 2, line 47, "the" should read --to--.

Column 2, line 63, "to" (third occurrence) should read --of--.

Column 5, line 22, "3,25" should read --3.25--.

Column 6, line 52, "$(\nu_2)$" should read --$(\nu_d)$--.

Column 6, line 61, "HCL" should read --HCl--.

Signed and Sealed this

Twentieth Day of December, 1988

Attest:

DONALD J. QUIGG

Attesting Officer  Commissioner of Patents and Trademarks